UNITED STATES PATENT OFFICE.

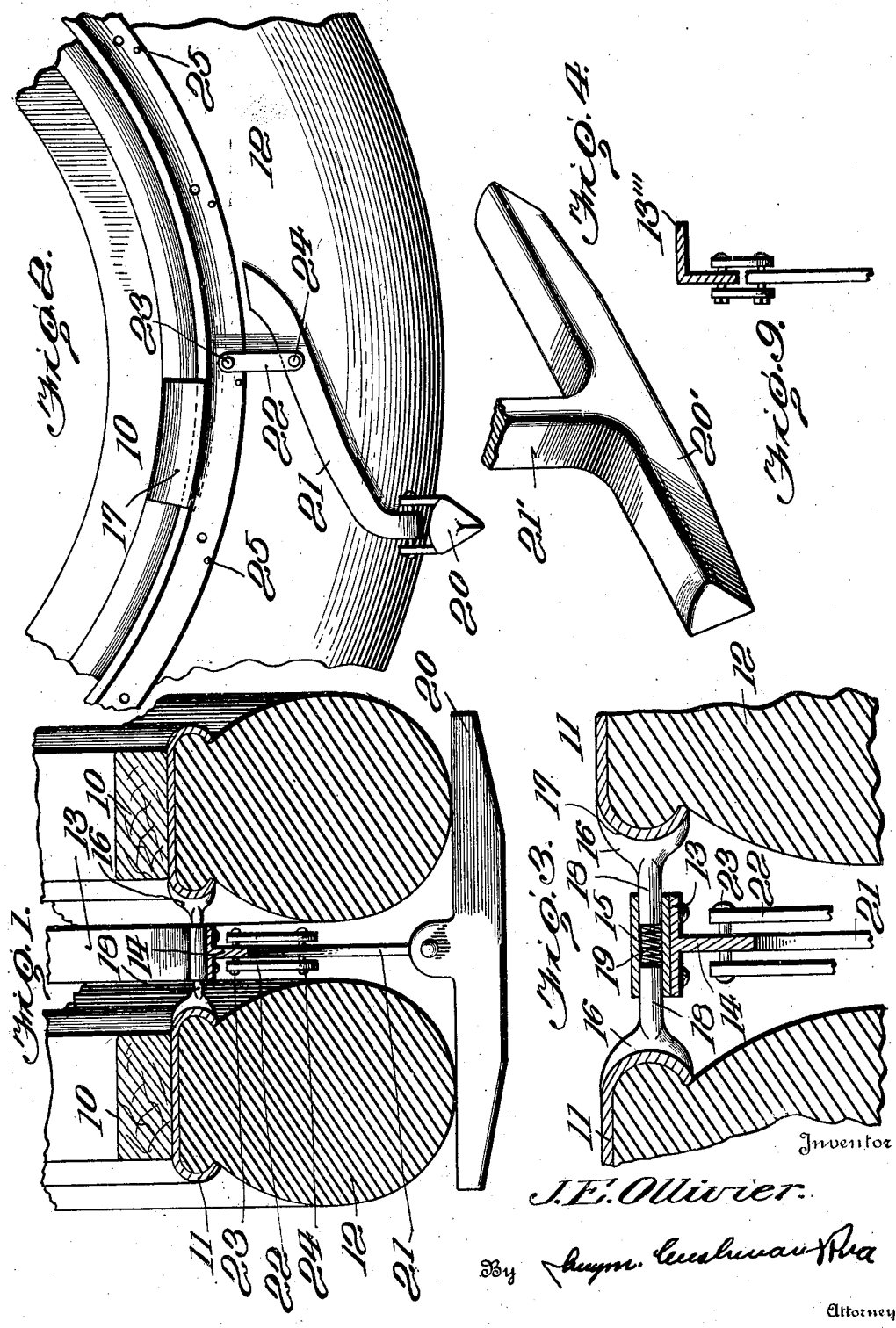

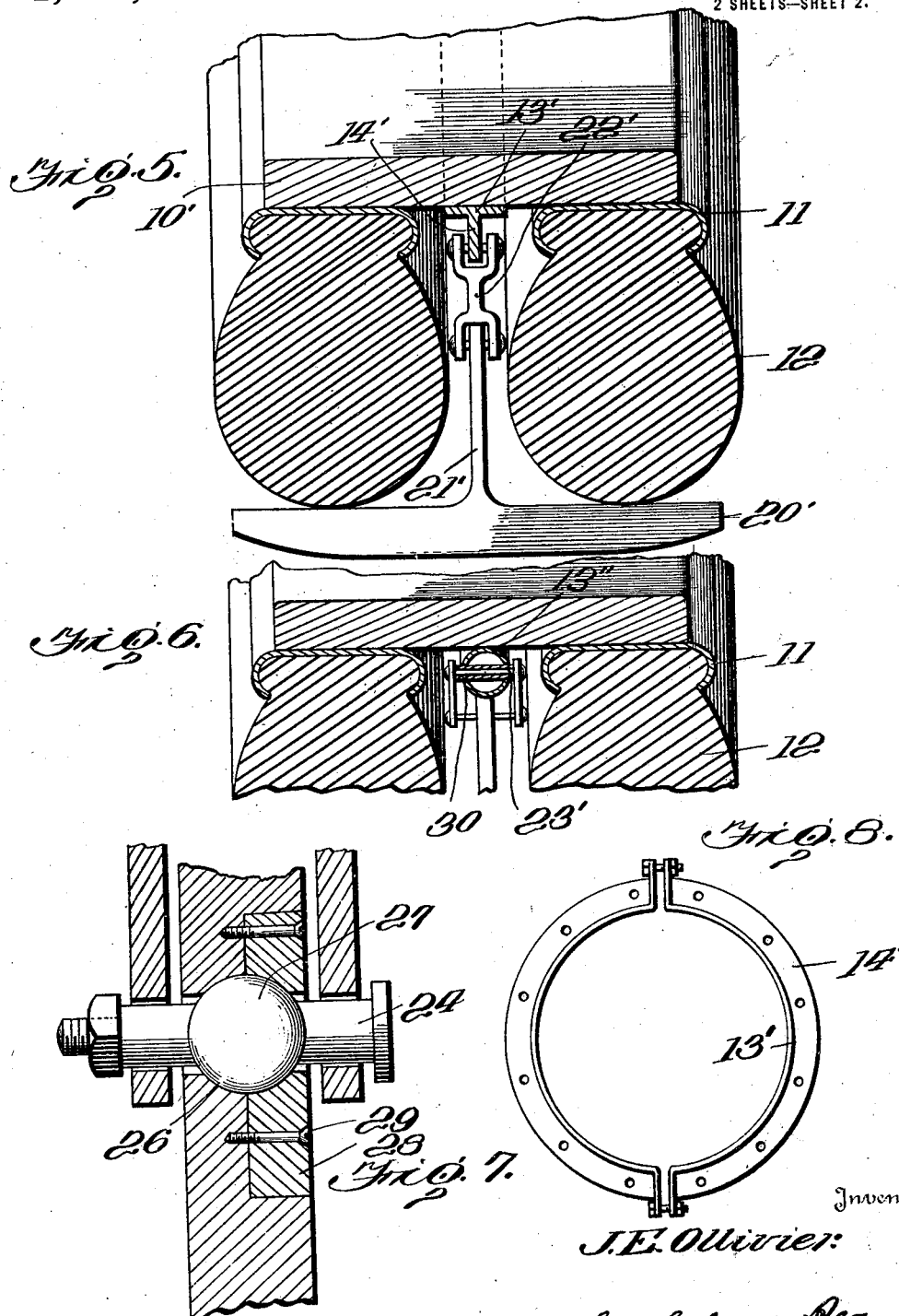

JOCELYN-EMILE OLLIVIER, OF HAUTE-SAVOIE, FRANCE.

TRACTION-INCREASING DEVICE.

1,352,683.   Specification of Letters Patent.   Patented Sept. 14, 1920.

Application filed August 10, 1917. Serial No. 185,482.

*To all whom it may concern:*

Be it known that I, JOCELYN-EMILE OLLIVIER, a citizen of France, residing at Haute-Savoie, France, have invented new and useful Improvements in Traction-Increasing Devices, of which the following is a specification.

This invention relates to automobile sleds and has particular reference to driving means therefor.

My invention has as its purposes to provide certain hereinafter described improvements in the driving mechanisms disclosed in United States Letters Patent No. 1,225,998 and 1,225,999, granted to me May 15th, 1917.

In the accompanying drawings:

Figure 1 is a transverse sectional view through the felly portion of a twin wheel and shows one embodiment of my invention.

Fig. 2 is an elevational view of the structure shown in Fig. 1, with one-half or part of the twin wheel removed, the major portion of the remaining wheel section being broken away.

Fig. 3 is an enlarged detail view taken transversely through the means for securing the spike-carrying member to the wheel.

Fig. 4 is a perspective view of a slightly modified form of spike.

Fig. 5 is a vertical sectional view through a twin wheel having both tread members mounted on the same felly and illustrates another embodiment of my invention.

Fig. 6 is a view similar to Fig. 5, a portion of the tread members being broken away, and shows another form of my invention.

Fig. 7 is a transverse sectional view through an improved connection between the arms which carry the spikes and the links which connect the arms to the wheel.

Fig. 8 is a side elevational view of a ring or band which encircles the felly of the wheel shown in Figs. 5 and 6.

Fig. 9 is a sectional view through a slightly different form of band or ring to which the spikes are connected.

In the drawings, like characters represent like parts throughout the several views. In the embodiment disclosed in Figs. 1 to 3, I have shown one form of my invention applied to a twin wheel made up of a pair of wheels, each having a felly 10, a metallic rim 11, and a tread member 12 carried by the rim 11, the tread members in the present instance being illustrated as comprising solid rubber tires. The two members or wheels of the composite twin wheel are spaced apart as shown and may be independently removed from the axle on which they are mounted as will be readily understood by those familiar with the art.

In the space between the tread members 12 of the twin wheel is located the means by which the spikes or teeth are connected to the wheel. This means, in Figs. 1 to 3, comprises a ring or band 13 having an external circumferential flange 14. The band 13 is preferably formed of a strip of T-iron bent into circular form and having its opposite ends welded together. Secured to the internal surface of the ring 13 by means of rivets, welding, or the like, are spaced-apart transversely extending tubular guides 15. 16 designates plungers having enlarged heads or ends with their outer faces curved inwardly, as at 17, so as to correspond to the convexity of the rim 11. Each of the plungers has a stem 18 slidably mounted within the bore of the tubular guides 15. Each of the guides 15 receives the stems of two of the plungers and between the opposing ends of the stems 18 is a coil spring 19 which urges the plungers outwardly and retains the concave portions 17 thereof against the sides of the rims 11.

The spikes, designated by the numeral 20, extend transversely of the tread members 12, and each is connected intermediate its ends to an arm 21 located in the annular space between the tires 12. The spikes are preferably constructed of bars triangular in cross section and have one angle faced outwardly of the tread members so as to provide an edge which bites into the surface of the snow over which the sled is traveling. Preferably, the spike 20 is hinged intermediate its ends to the outer end of the arm 21 on a transverse line or pivot so that the spike may more easily accommodate itself to the deformation of the tires when the latter are passing over undulations or rough surfaces, and thus strains on the connection between the spike and the ring 13 are obviated.

In Fig. 4, the arm 21' is illustrated as being integral with the spike 20'.

Each of the arms 21 is connected to the ring 13 by means of a pair of links 22.

The links 22 at their inner ends are hingedly connected to the flange 14 of the ring 13 by pintles 23. The outer ends of the links are connected to the arms 21 by means of pins 24. It will be seen from the drawings that the arms 21 are in the same plane as the flange 14, that the inner ends of the arms extend beyond the points where they are pivoted to the links 22, and the arms are oppositely curved at their opposite ends so that the flat surfaces on the backs of the spikes may engage flatwise against the tires and the inner ends of the arms engage against the periphery of the flange 14. On the flange 14 adjacent the pintles 23 are stops 25 against which the links engage upon rotation of the wheel to limit the movement of the spikes.

If desired, the arm 21 may be secured to the links 22 in a manner shown in Fig. 7. In this figure, the arm has a spherical recess or socket 26 which receives a spherical ball 27 located centrally of the pin 24. To facilitate removal of the ball from the socket, one-half of the socket is located within the body portion of the arm, and the other half in a block 28 removably secured in place by screws 29. This arrangement permits of a slight lateral movement of the arms relative to the links without exerting any lateral strain upon the latter.

With the structure shown in Figs. 1 to 3, when inserting my improved mechanism in the space between the tread surfaces, one of the members of the composite twin wheel is removed from the axle of the vehicle; the ring 13, 13, together with the parts carried thereby, is then placed adjacent the part of the wheel still remaining on the axle, and with the curved surfaces 17 of the plungers 16 extending from one side of the ring in engagement with the rim 11. The other wheel section is then slid upon the axle and when forced into place engages the plungers 16 extending toward the wheel section from ring 13. The springs 19 are placed under compression, and the force of these springs is great enough to cause the plungers to firmly grip the rims.

When the vehicle is moving the wheel rotates and the spikes or teeth 20 are successively brought into contact with the snow.

The stops 25 prevent the links from moving in a clockwise direction to too great an extent, and due to the engagement between the ends of the arms 21 and the flange 14, the teeth or spikes 20 are prevented from separating any great distance from the tires.

In the embodiment shown in Fig. 5, I have illustrated a slightly different form of my invention applied to a twin wheel having both of the rims 11 carying the tires 12 secured to a single felly 10′. Surrounding that portion of the felly between the rims 11 is a ring or band 13′ formed of T-iron and preferably constructed in two semi-circular parts bolted together as shown in Fig. 8. In this embodiment, each of the arms 21′ carrying the spikes 20′ is connected to the flange 14′ of the band or ring 13′ by means of a single link 22′ having its opposite ends forked, and between the yoke arms of which are secured the flange 14′ and the arm 21′.

In the embodiment shown in Fig. 6, is illustrated the same type of wheel as that shown in the preceding figure. In this instance, however, the band or ring 13″ is constructed of tubing through which extend spaced-apart sleeves 30 which form bearings for the pintles 23′.

It is, of course, understood that my invention is susceptible of various modifications and changes which would be within the spirit of the invention without departing from the scope of the following claims. As illustrating one of the numerous other changes which may be made in my structure, I have shown in Fig. 9, the ring 13‴ as comprising a band formed of angle-iron.

What I claim is:

1. The combination with a vehicle wheel having a pair of spaced apart tread surfaces of a ring arranged between the treads and adjacent the rim of the wheel, links pivotally connected with and extending outwardly from said ring, and arms each pivotally connected at an intermediate point in its length to one of the links and each arm having at its outer end an individual spike that projects beyond the tread surfaces, the inner ends of said arms being adapted to connect with the supporting ring to limit turning movement of the arm and spike relative to the wheel in one direction.

2. The combination with a vehicle wheel having a pair of spaced apart tread surfaces, of a ring, of angular form in cross section, arranged adjacent the wheel rim between the tread surfaces and having one member extending radially outward from said rim, links pivotally connected at their inner ends to said radially projecting member of the ring, a lever pivotally connected to each link and extending circumferentially of the wheel between the tread surfaces thereof, and spikes each extending transeversely across the tread surfaces and provided intermediate of said surfaces with an inwardly projecting member which is pivotally connected to one of said levers.

3. The combination with a vehicle wheel having a pair of tread surfaces, of a ring arranged adjacent the wheel rim between the tread surfaces thereon, arms projecting laterally from said ring and having their outer ends concaved to receive portions of the wheel rim adjacent the base of each tread portion, means for yieldingly forcing said arms into engagement with the rim, and spikes positioned beyond the tread surfaces and supported by means extending between said surfaces and connected to said ring.

4. The combination with a vehicle wheel having a pair of spaced apart tread surfaces, of a ring of angular form in cross section, arranged adjacent the wheel rim between the tread surfaces and having one member extending radially outward from said rim, bifurcated links extending on opposite sides of and pivotally connected to said radially projecting member of the ring, a lever extending between the members of each link and pivotally connected thereto at an intermediate point in its length, the inner end of each lever being adapted to contact with said ring to limit turning movement of the lever in one direction about its pivotal connection with its supporting link, and an individual spike pivotally connected with the outer end of each lever and positioned beyond the tread surfaces of the wheel.

5. The combination with a vehicle wheel having a pair of tread surfaces, of a ring connected to said vehicle wheel intermediate the tread surfaces, a spike extending transversely of the tread surfaces, an arm connecting the spike to said ring, and spring-pressed plungers carried by and extending from the opposite sides of said ring for securing the ring to the wheel.

In testimony whereof I have hereunto set my hand.

JOCELYN-EMILE OLLIVIER.